US008874973B2

(12) United States Patent
Hunt et al.

(10) Patent No.: US 8,874,973 B2
(45) Date of Patent: Oct. 28, 2014

(54) METHODS AND STRUCTURE TO ASSURE DATA INTEGRITY IN A STORAGE DEVICE CACHE IN THE PRESENCE OF INTERMITTENT FAILURES OF CACHE MEMORY SUBSYSTEM

(71) Applicant: LSI Corporation, Milpitas, CA (US)

(72) Inventors: Brandon L. Hunt, Colorado Springs, CO (US); Luke E. McKay, Rose Hill, KS (US); Moby J. Abraham, Lilburn, GA (US); Lakshmana M. Anupindi, Suwanee, GA (US)

(73) Assignee: LSI Corporation, Milpitas, CA (US)

( * ) Notice: Subject to any disclaimer, the term of this patent is extended or adjusted under 35 U.S.C. 154(b) by 140 days.

(21) Appl. No.: 13/661,369

(22) Filed: Oct. 26, 2012

(65) Prior Publication Data

US 2014/0122922 A1 May 1, 2014

(51) Int. Cl.
*G06F 11/00* (2006.01)

(52) U.S. Cl.
USPC .......................................... 714/42; 711/106

(58) Field of Classification Search
USPC .......................................................... 714/42
See application file for complete search history.

(56) References Cited

U.S. PATENT DOCUMENTS

| 5,713,006 | A  | * | 1/1998  | Shigeeda ...................... 711/170 |
| 5,793,776 | A  | * | 8/1998  | Qureshi et al. ................ 714/724 |
| 6,119,200 | A  | * | 9/2000  | George ......................... 711/106 |
| 6,570,803 | B2 | * | 5/2003  | Kyung .......................... 365/222 |
| 6,829,677 | B1 | * | 12/2004 | Attaway et al. ............... 711/106 |
| 7,024,571 | B1 | * | 4/2006  | Reger et al. .................... 713/323 |
| 7,139,937 | B1 | * | 11/2006 | Kilbourne et al. .......... 714/47.2 |
| 7,216,198 | B2 | * | 5/2007  | Ito et al. ....................... 711/106 |
| 7,324,398 | B2 | * | 1/2008  | Shim et al. .................... 365/212 |
| 7,337,367 | B2 |   | 2/2008  | Mirabeau et al. |
| 7,624,260 | B2 | * | 11/2009 | Ethier et al. ...................... 713/2 |
| 7,717,752 | B2 | * | 5/2010  | Loughner et al. ............. 439/633 |
| 8,000,927 | B2 | * | 8/2011  | Sukegawa ..................... 702/179 |
| 8,171,353 | B2 |   | 5/2012  | Porterfield |
| 8,296,508 | B1 | * | 10/2012 | Zanardi et al. ................. 711/103 |
| 8,631,194 | B2 | * | 1/2014  | Wakasa .......................... 711/106 |
| 2010/0003837 | A1 | * | 1/2010 | Loughner et al. ............... 439/64 |
| 2010/0007770 | A1 | * | 1/2010 | Koganezawa et al. ... 348/231.99 |
| 2011/0156792 | A1 | * | 6/2011 | Porterfield .................... 327/307 |
| 2012/0131253 | A1 | * | 5/2012 | McKnight et al. ............ 710/308 |
| 2013/0155788 | A1 | * | 6/2013 | Brandl et al. .......... 365/189.011 |
| 2014/0029364 | A1 | * | 1/2014 | Bhakta et al. ................. 365/201 |
| 2014/0089577 | A1 | * | 3/2014 | Lee et al. ....................... 711/106 |

* cited by examiner

Primary Examiner — Kamini Patel
(74) *Attorney, Agent, or Firm* — Duft Bornsen & Fettig LLP

(57) ABSTRACT

Methods and structure for enabling re-training of a DDR memory controller in a storage device without loss of data in the DDR memory devices of the cache memory in response to detecting failure of the memory subsystem during operation of the storage device. In response to detecting a failure of the memory subsystem, the memory controller is reset without resetting the memory devices. The memory controller is then re-trained for operation with the memory device. During the re-training, self-refresh mode of the memory devices is disabled and manual refresh is performed by a processor of the storage device to thereby retain any user data in the memory device.

11 Claims, 4 Drawing Sheets

METHODS AND STRUCTURE TO ASSURE DATA INTEGRITY IN A STORAGE DEVICE CACHE IN THE PRESENCE OF INTERMITTENT FAILURES OF CACHE MEMORY SUBSYSTEM

BACKGROUND

1. Field of the Invention

The invention relates generally to storage system cache memories subsystems and more specifically relates to methods and structure for maintaining integrity of data in a cache memory of a storage device despite intermittent failure of the memory subsystem during reset/initialization operation of the storage device.

2. Discussion of Related Art

Storage devices (e.g., disk controllers or storage controllers) typically include a large cache memory for storing recently accessed user data. The content of the cache memory may then be used to quickly complete subsequent read requests for data from the storage device (or storage subsystem). Given the desire for a large capacity cache memory, dynamic RAM memory components are typically utilized to provide lower cost high capacity cache memory. To enhance performance of the cache memory, double data rate (DDR) memory devices and controllers are typically employed (collectively referred to herein as a "memory subsystem"). In DDR memory subsystems, the DDR memory controller is initialized as part of start-of-day or reset processing. This initialization typically includes a "training" process in accordance with DDR memory standards. The training process enables the memory controller to test and configure various timing parameters to adjust for the signal timing requirements of the specific DDR memory devices that it controls.

Once the memory subsystem has been initialized (trained), the storage device can commence normal operations using the cache memory subsystem to store user data. On occasion, the storage device may detect a failure of the memory subsystem in attempting to train the memory subsystem or during other operation of the storage device. Sometimes the failures may be un-recoverable failures of the electronic circuits that comprise the memory subsystem. In such cases, no recovery is possible for the storage device and other data recovery techniques may be required to save data in the cache memory subsystem (e.g., redundant system configurations in which another storage device may take control replacing the failed device (e.g., "failover" in redundant systems often utilizing RAID control techniques).

However, there are some intermittent errors that may arise, for example, when the design of the storage device memory subsystem is operating very close to the limits of the specifications of the memory subsystem. For example, if the storage device is reset to recover from a storage access problem or power is lost to the storage controller while a battery backup retains the contents of the memory devices, the memory controller may be in an unusable or unstable state after the reset or power loss and thus may require re-training. Or for example, during normal operation the memory subsystem may indicate an error condition that is unexpected. In such cases it may be possible to reset the memory subsystem to eliminate the error condition. However, such a reset of the memory subsystem risks loss of user data presently stored in the cache memory subsystem. Such loss of data may be unacceptable in high-reliability storage applications.

Thus it is an ongoing challenge to attempt correction of some intermittent memory subsystem failures without risk of data loss.

SUMMARY

The present invention solves the above and other problems, thereby advancing the state of the useful arts, by providing methods and structure for enabling re-training of a DDR memory controller in a storage device without loss of data in the DDR memory devices of the cache memory in response to detecting failure of the memory subsystem during operation of the storage device. As used herein, "failure" of the memory subsystem may generally include: a reset of the storage device, loss of power to the memory controller, or detecting a failure of the memory subsystem during normal operation of the storage device. More specifically, a "failure" as used herein refers to a need to attempt re-training of the memory controller. Responsive to detecting such a failure, the memory controller is reset without resetting the memory devices. The memory controller is then re-trained for operation with the memory device. During the re-training, self-refresh mode of the memory devices is disabled and manual refresh is performed by a processor of the storage device to thereby retain any user data in the memory device.

In aspects hereof, a method and a computer readable medium tangibly embodying instructions for the method are provided. The method is operable in a storage device having a cache memory subsystem. The memory subsystem comprises a DDR memory controller coupling a computational device of the storage device with one or more DDR memory devices. The method comprises initializing the storage device where the initialization comprises successfully training the memory controller to interface with the memory devices. The method also comprises detecting a failure of the memory subsystem, configuring the memory devices to enable a self-refresh mode responsive to detecting the failure, and initiating a re-training process between the memory controller and the memory devices responsive to detecting the failure. The re-training process comprises configuring the memory devices to disable the self-refresh mode and manually refreshing contents of the DDR memory devices by operation of the computational device.

Another aspect hereof provides a method operable in a storage device having a cache memory subsystem. The memory subsystem comprises a DDR memory controller coupling a computational device of the storage device with one or more DDR memory devices. The method is operable in response to detecting a failure of the memory subsystem during operation of the storage device following a successful training of the memory controller. The method comprises configuring the memory devices to enable a self-refresh mode, configuring the memory subsystem to de-couple a reset signal applied to the memory controller from a reset signal applied to the memory devices, applying a reset signal to the memory controller without resetting the memory devices, and determining whether user data is presently stored in the memory devices. Responsive to a determination that no user data is presently stored in the memory devices, the method further comprises configuring the memory subsystem to couple the reset signal applied to the memory controller with the reset signal applied to the memory devices, applying a reset signal to the memory controller and the memory devices, and re-training the memory controller. Responsive to a determination that user data is presently stored in the memory devices, the method further comprises initiating a re-training process between the memory controller and the memory devices, and during at least a portion of the re-training process, performing the additional steps of configuring the memory devices to disable the self-refresh mode, and manually refreshing contents of the DDR memory devices by operation of the computational devices.

DETAILED DESCRIPTION OF THE DRAWINGS

Figure 1:
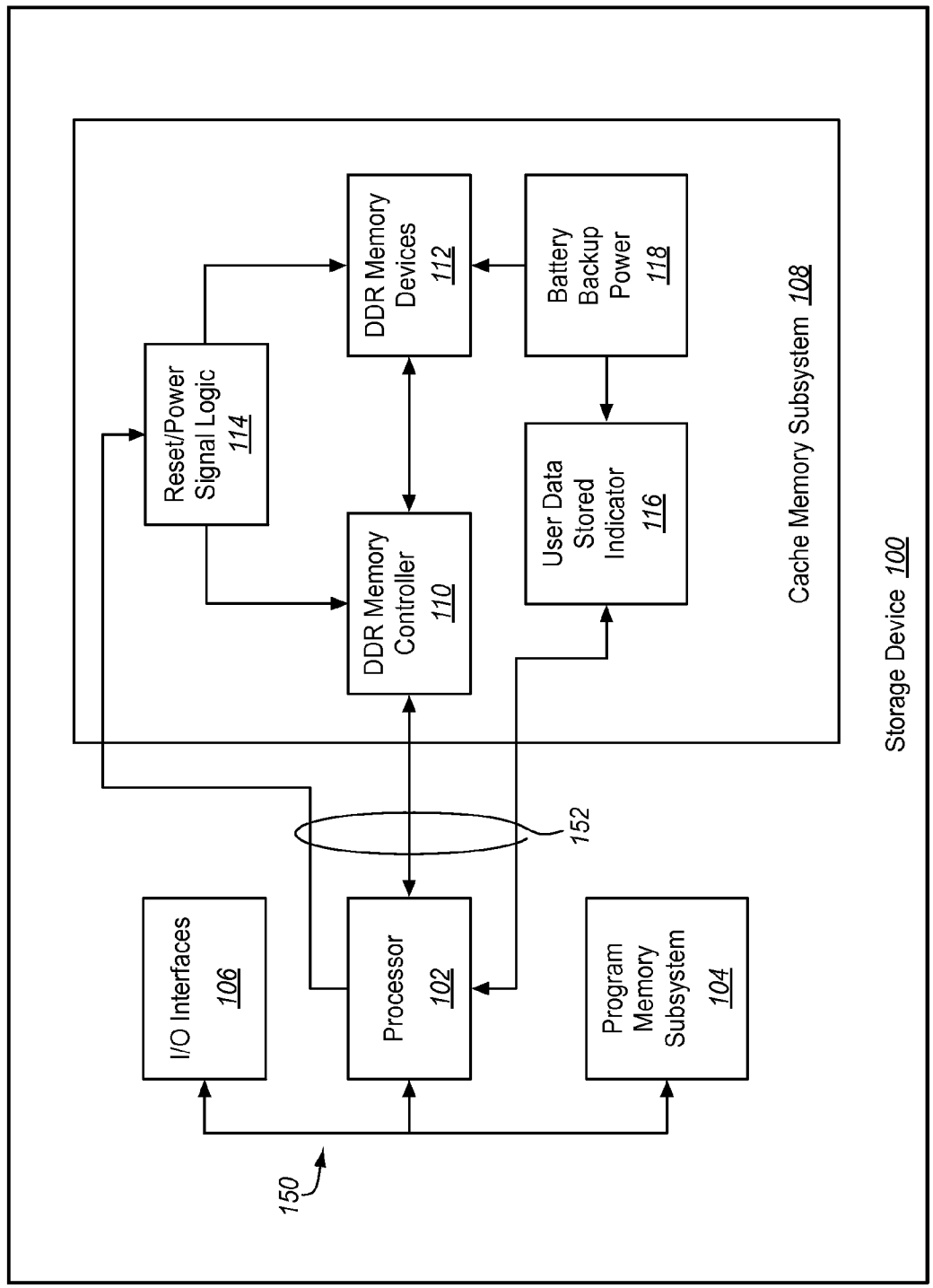
FIG. 1 is a block diagram of an exemplary storage device enhanced in accordance with features and aspects hereof to re-train a memory controller of its cache memory without loss of data stored in the cache memory.

FIG. 1 is a block diagram of a an exemplary storage device 100 enhanced in accordance with features and aspects hereof to correct intermittent cache memory subsystem errors without risking loss of data in the cache. Storage device 100 comprises a general or special purpose processor 102 operable to receive and process I/O requests from an attached host system (not shown). Processor 102 operates in accordance with suitably programmed instructions and data stored in program memory subsystem 104. In other embodiments, processor 102 may be a suitably designed custom circuit or may be combinations of custom circuits and programmable processors. Program memory subsystem 104 of device 100 may comprise any suitable memory components including, for example, dynamic RAM (DRAM), flash memory, PROM, EEPROM, etc. Processor 102 may receive I/O requests to be processed via an appropriate I/O interface 106 of device 100. Further, in processing an I/O request, information may be stored on a persistent storage medium (not shown) coupled through another I/O interface 106. By way of example, storage device 100 may be a disk controller integrated within a single disk drive. In other embodiments, storage controller 100 may be a storage controller adapted to couple one or more host systems (through appropriate interfaces 106) with one or more external storage devices (e.g., a RAID or other logical volume storage controller adapted couple one or more host systems to one or more logical volumes provisioned on one or more physical storage devices all coupled with the storage controller through suitable interfaces). In still other embodiments, storage device 100 may be a storage controller integrated within a host system such as a host bus adapter (HBA) operable to couple the host system with one or more external storage devices.

Processor 102 may be coupled with I/O interfaces 106 and program memory subsystem 104 via any suitable system/processor bus/buses 150.

Storage device 100 further comprises cache memory subsystem 108 for use by processor 102 to cache user data received provided in write I/O requests from an attached host system. As is well known to those of ordinary skill in the art various forms of storage controllers (e.g., storage device 100) may provide such caching services to improve performance in responding to I/O read requests such that previously written data may be rapidly retrieved from cache memory subsystem 108 rather than by the typical slower access to a persistent storage medium. As such, cache memory subsystem 108 typically comprises a memory controller such as DDR memory controller 110 coupled with suitably compatible memory devices such as DDR memory devices 112. In many high reliability applications, memory devices 112 may be coupled with battery backup power 118 to retain the data stored therein in case of power loss to storage device 100. As is generally known in the art, memory controller 110 may comprise any standard, commercially available memory controller or may comprise a custom design circuit for such memory control applications. Further, controller 110 may be configured to perform a "training" sequence/process to test and configure various potential signal timings and signal thresholds to assure proper operation in accessing information stored in DDR memory devices 112.

Processor 102 may be coupled with cache memory subsystem 108 via any suitable system/processor bus/buses 152. In some embodiments, buses 150 and 152 may be the same bus structure.

In accordance with features and aspects hereof, storage device 100 is operable to attempt to correct infrequent, intermittent failures of cache memory subsystem 108 by attempting to re-train memory controller 110 responsive to detecting a failure of storage device 100. As noted above, a "failure" as used herein refers to events such as: reset of storage device 100, loss of power to storage device 100, or an intermittent failure of memory subsystem 108 detected during normal operation of storage device 100. In other words, following start-of-day initialization of storage device 100, normal operation is commenced in which read and write I/O requests are completed utilizing cache memory subsystem 108. If during such normal operation, processor 102 detects a "failure", the processor (upon restoration of power or in processing the reset event) attempts to re-train memory controller 110 in such a manner as to assure retention of any user data previously stored in memory devices 112.

In operation, processor 102 generally provides for manual refresh of memory devices 112 while attempting to re-train memory controller 110. In other words, self-refresh of memory devices 112 or automated refresh typically provided by memory controller 110 while in normal operation may be disabled in favor of processor 102 periodically accessing user data in memory devices 112 in such a manner as to ensure refresh of the content of memory devices 112 while the re-training of memory controller 110 proceeds.

In some exemplary embodiments, memory controller 110 and memory devices 112 may be designed in separate reset/power domains of device 100. Such a design would permit reset of memory controller 110 without forcing a similar reset of memory devices 112 (thereby erasing user data any user data stored therein). In other exemplary embodiments, reset and power signal logic 114 may, under control of processor 102, reconfigure cache memory subsystem 108 such that reset and power signals are either coupled together or decoupled to permit separate reset signals and/or power signals to be directed to memory controller 110 and memory devices 112 of subsystem 108. In some instances, processor 102 may prefer to reset both controller 110 and devices 112 with a single reset signal while in other circumstances, as described further herein below, reset signals may be preferably applied separately to controller 110 and devices 112.

In some exemplary embodiments, retention of user data in memory devices 112 may be presumed to be always necessary while attempting re-training of memory controller 110 in response to the detection of a "failure". Alternatively, in some embodiments, subsystem 108 may further comprise a user data stored indicator 116 used by processor 102 to persistently latch a status signal indicating whether or not user data is presently stored in memory devices 112. Indicator 116 may be any suitable memory component including, for example, a RAM device, a flash memory device, a register, a flip-flop, or any other suitable programmable memory component accessible to processor 102. Indicator 116 may also be coupled with battery backup power 118 to retain its stored state despite loss of power to storage device 100.

Those of ordinary skill in the art will readily recognize numerous additional and equivalent elements that may be present in a fully functional storage device 100. Such additional and equivalent elements are omitted herein for simplicity and brevity of this discussion.

Figure 2:
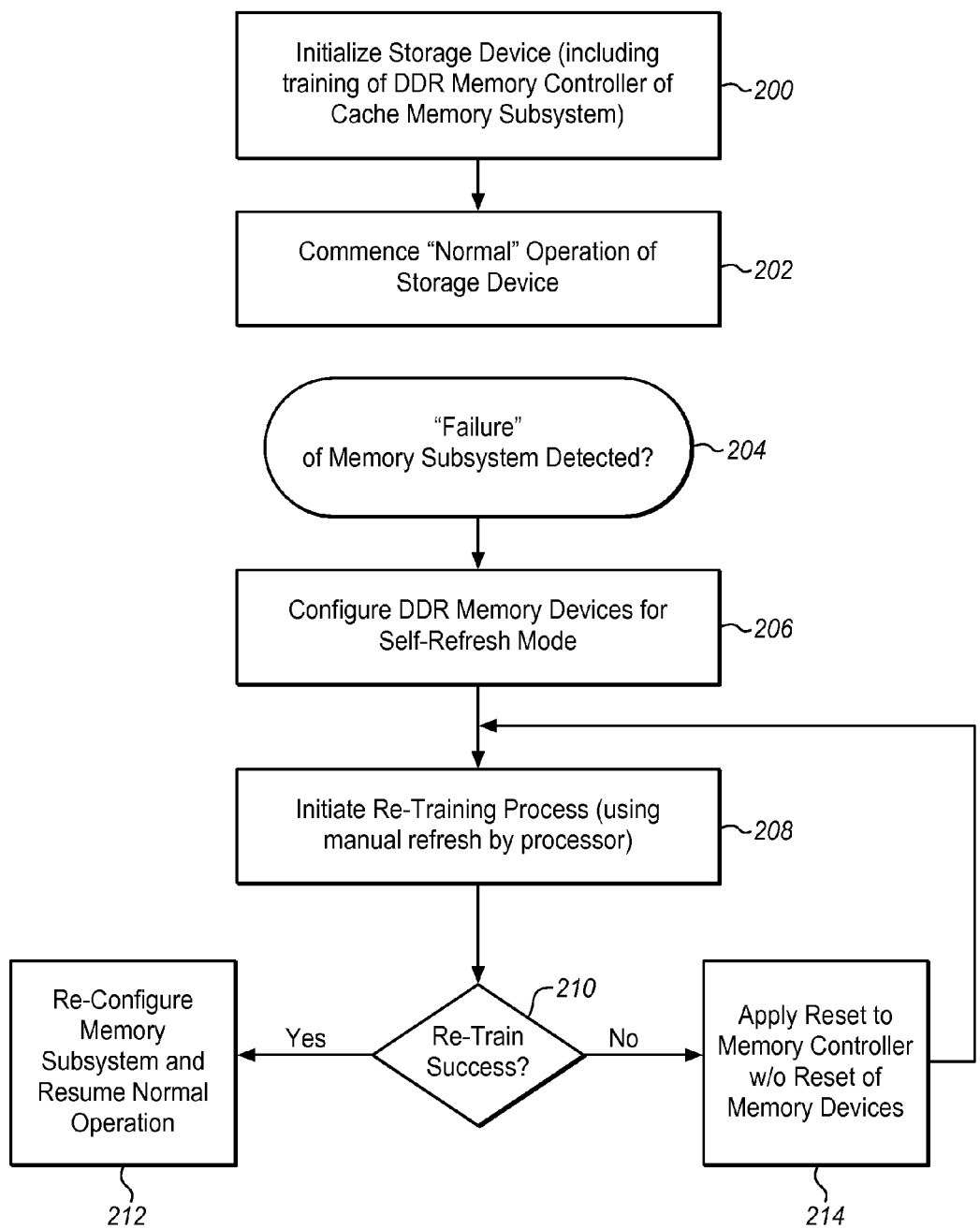
FIGS. 2 and 3 are flowcharts describing exemplary methods in accordance with features and aspects hereof to re-train a memory controller of its cache memory without loss of data stored in the cache memory.

FIG. 2 is a flowchart describing an exemplary method for re-training a memory controller without risking loss of user data in the associated memory devices in accordance with features and aspects hereof. The method of FIG. 2 may be performed within an enhanced storage device such as storage device 100 of FIG. 1 and more specifically may be performed through execution of suitably programmed instructions by processor 102 of device 100. Step 200 represents typical start-of-day processing of the storage device including typical startup training of the DDR memory controller within the cache memory subsystem of the storage device. As used herein, "start of day" initialization refers to a first start of storage device 100 in such a manner as to be assured that no user data is presently stored in the cache memory subsystem. Training procedures are generally well known to those of ordinary skill in the art (e.g., gate training, read leveling, write leveling, etc.). However, specific details of training depend on the particular interface (i.e., the PHY used for coupling a memory controller to the memory devices it controls) as well as specific details of the memory controller circuit and the particular memory devices chosen. The particular timing and other parameters to be "trained" are therefore specific to a particular application but the general need for such training is known to those in the art. At step 202, the storage device commences "normal" operation—the cache memory subsystem has been completely initialized, the cache memory controller has been trained, and all other data and information required for operation of the storage device has been suitably initialized. "Normal" operation refers to the mode of operation of the storage device in which it is operable to receive and process I/O requests utilizing the cache memory subsystem. At any time during normal operation, a "failure" may be detected as an asynchronous event. As noted above, "failure" as used herein refers to events such as a reset of the storage device, a loss of power to the storage device, or a failure of the cache memory subsystem detected during normal operation. Step 204 therefore represents asynchronous detection of a "failure" of the cache memory subsystem. As noted above, despite completion of the initialization and training of the memory controller, where a design is operating near the limits of specification of the memory devices, intermittent errors may occur in use of the cache memory subsystem. Sometimes such errors may be generated due to variations of environmental conditions such as voltage changes or temperature changes. In like manner, re-initiation of a reset on the storage device (e.g., due to loss of power to the storage device or due to error recovery procedures by the storage device) could force clearing of cached data if not intercepted and processed in accordance with features and aspects hereof. Features and aspects hereof attempt to recover from the "failure" without risking loss of user data presently stored in memory devices of the cache memory subsystem.

Responsive to detecting such a failure, step 206 reconfigures the DDR memory devices to utilize a self-refresh mode until re-training is commenced by the storage device and then completed without affecting contents of the cache memory. Step 208 initiates the re-training process for the memory controller while relying on manual refresh operations between the processor and the memory devices rather than the automated refresh of the memory controller or the self-refresh mode of the memory devices per se. Step 210 then determines whether the re-training process has completed successfully or not. If the re-training process completed successfully, step 212 reconfigures the memory subsystem to allow resumption of normal operation. The reconfiguration may entail restoring the memory devices to an appropriate refresh mode (e.g., self-refresh or automated refresh by the memory controller) as required for ongoing normal operation. Following any requisite reconfiguration, processing of I/O requests by the storage controller resumes in its normal mode of operation with knowledge that the cache memory subsystem contents prior to the failure are intact.

If step 210 determines that the re-training process was not successful, step 214 applies a reset signal to the memory controller without causing a reset of the memory devices per se. Resetting the memory controller may clear an erroneous state of the memory controller such that re-training may be retried to correct the failure. However, as noted above, the reset signal is applied in such a way as to reset only the memory controller so that any presently stored user data in the memory devices will be retained. Processing then continues looping back to step 208 to initiate again a re-training process for the memory controller relying on the manual refresh capabilities of the processor to retain user data in the memory devices. In some embodiments, a retry counter may be utilized to limit the number of attempts to re-train the memory controller. When a suitable number of retries have been attempted, the error may be presumed to be a fatal persistent error such that other error recovery or replacement of the storage device may be applied.

Figure 3:
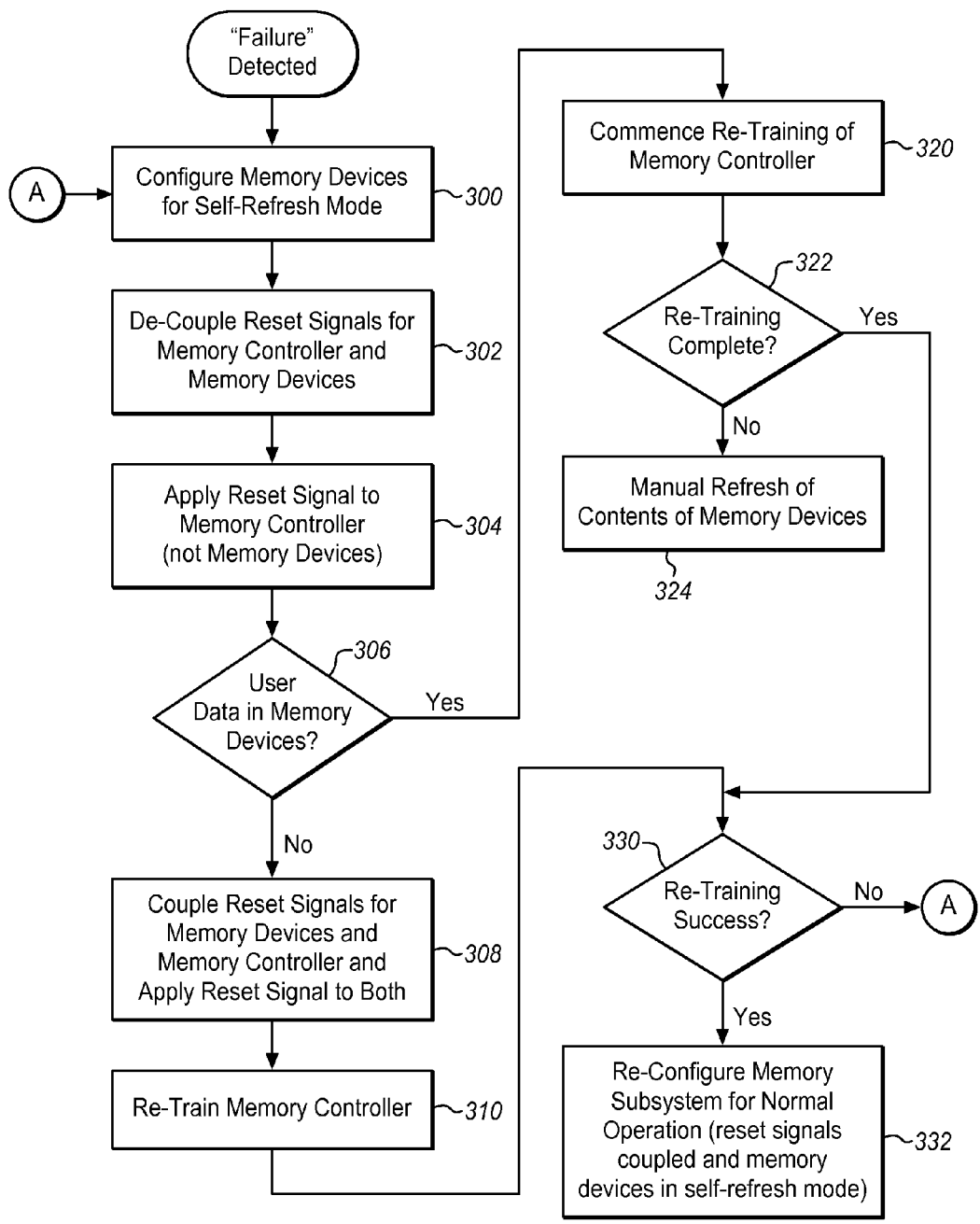

FIG. 3 is a flowchart describing another exemplary method in accordance with features and aspects hereof to attempt correction of detected failures in a cache memory subsystem of an enhanced storage device. The method of FIG. 3 is operable in an enhanced storage device such as storage device 100 of FIG. 1 and more specifically is operable by execution of suitably programmed instructions by processor 102 of controller device 100. In particular, the method of FIG. 3 is operable responsive to detecting a "failure" of the cache memory subsystem ("failures" such as a reset of the storage device, loss of power to the storage device, or an error in the cache memory subsystem detected during normal operation). Step 300 reconfigures memory devices to enable the self-refresh mode until such time as the attempted re-training commences. At step 302 reset signals for the memory controller and memory devices are decoupled. As noted above, in some exemplary embodiments, the reset signals may be controllably coupled or decoupled so that both the memory controller and memory devices may be reset with a single reset signal to both the controller and the memory devices or must be reset with separate reset signals. Step 304 then applies a reset signal to the memory controller in such a manner as to reset the controller but not reset the memory devices coupled with the controller. Step 306 then determines whether any user data is presently stored in the memory devices. As noted above, in some exemplary embodiments, a latch or other suitable non-volatile memory component (e.g., powered by a battery in case of loss of power to the storage device) may be set by the storage device (e.g., by the processor) to indicate that user data is presently stored in the memory devices. If no user data is presently stored, step 308 re-couples the reset signals for the memory devices and the memory controller and applies a reset signal to both components of the storage device (thus, erasing whatever data is presently in the memory devices since no user data was stored therein). Step 310 then initiates the re-training process for the memory controller. Processing then continues at step 330 to determine whether the re-training process succeeded. If so, step 332 reconfigures the memory subsystem for normal operation (e.g., reset signals may be re-coupled if previously decoupled and memory devices are reconfigured back into an appropriate refresh mode—self-refresh or automated refresh by operation of the memory controller as appropriate for the storage device design). "Normal" processing then resumes within the storage controller to process I/O requests until such time as another "failure" is detected. If step 330 determines that the re-training procedure failed, processing may loop back to step 300 (e.g., label "A") to retry the error recovery processing. In some embodiments, a retry counter may be utilized to limit the number of attempts to re-train the memory controller. When a suitable number of retries have been attempted without success, the error may be presumed to be a fatal persistent error such that other error recovery or replacement of the storage device may be applied.

If step 306 determines that user data is presently stored in the memory devices, step 320 commences re-training procedure of the memory controller. As noted above, the memory devices may have been reconfigured for self-refresh mode. However, during the re-training process, with user data stored in the memory devices, manual refresh of the contents of the memory devices is performed by operation of the processor of the storage device. Step 322 determines whether the re-training process has completed and, if so, processing continues at step 330 as discussed above. If not, step 324 represents suitable processing by the processor of the storage device to perform manual refresh of the contents of the memory devices while the re-training process continues. Processing then loops back to step 322 to await completion of the re-training.

Those of ordinary skill in the art will readily recognize numerous additional and equivalent steps that may be present in fully functional methods for assuring retention of user data while attempting to re-train a memory controller responsive to a detected failure. Such additional and equivalent steps are omitted here in person custody and brevity of this discussion.

Figure 4:
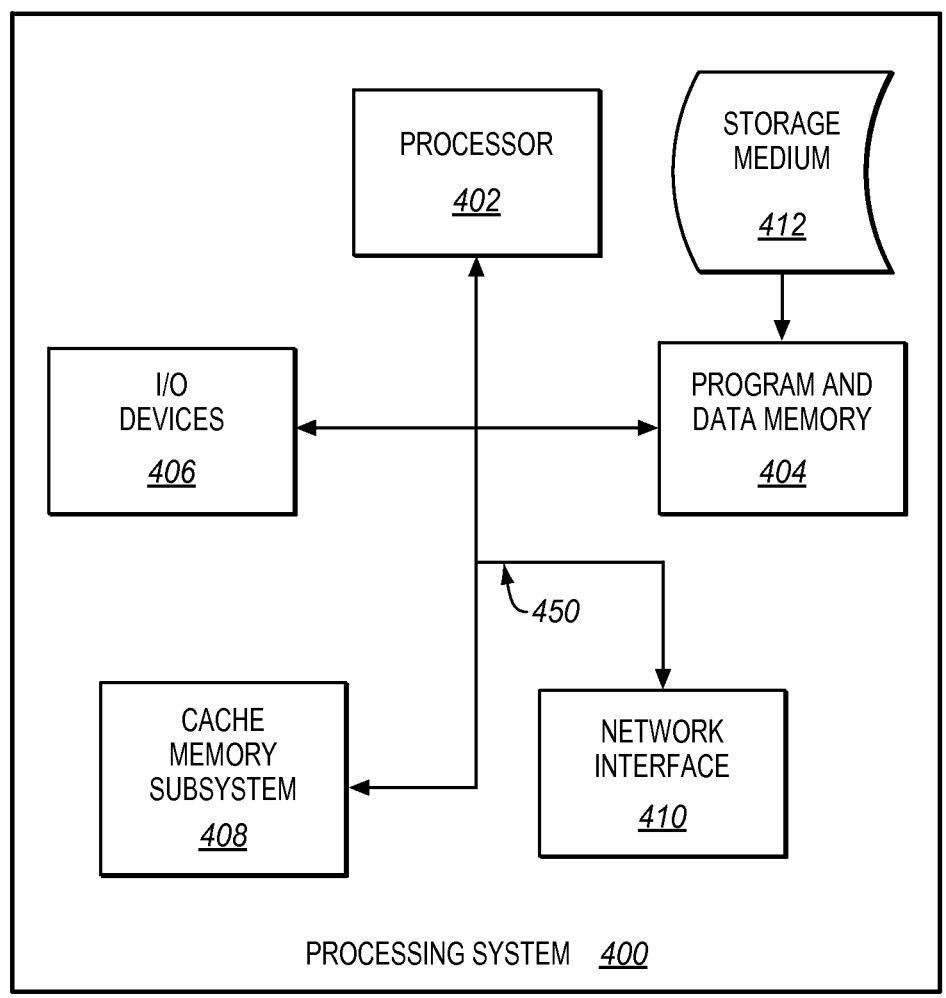
FIG. 4 is a block diagram of a processing system such as in the enhanced storage device of FIG. 1 adapted to utilize a computer readable medium tangibly embodying programmed instructions implementing methods in accordance with features and aspects hereof to re-train a memory controller of a storage device's cache memory without loss of data stored in the cache memory

Embodiments disclosed herein can take the form of software, hardware, firmware, or various combinations thereof. In one particular embodiment, software is used to direct a processing system of a storage device (e.g., a storage controller) to perform the various operations disclosed herein. FIG. 4 illustrates a processing system 400, such as within storage device 100 of FIG. 1, operable to execute programmed instructions stored in a computer readable medium to perform desired functions in an exemplary embodiment. Processing system 400 is operable to perform the above operations by executing programmed instructions tangibly embodied on computer readable storage medium 412. In this regard, embodiments of the invention can take the form of a computer program accessible via computer-readable medium 412 providing program code for use by a computer or any other instruction execution system.

For the purposes of this description, computer readable storage medium 412 can be anything that can contain or store the program for use by the computer. Computer readable storage medium 412 can be an electronic, magnetic, optical, electromagnetic, infrared, or semiconductor device. Examples of computer readable storage medium 412 include a solid state memory (e.g., a flash memory), a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 400, being suitable for storing and/or executing the program code, includes at least one processor 402 coupled to program and data memory 404 and to cache memory subsystem 408 through a system bus 450. Program and data memory 404 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 406 may further be included (e.g., devices for coupling with the storage medium and appropriate r/w channel circuits of the storage device such as a flash memory component of an SSD, a magnetic or optical rotating disk medium, as well as storage devices external to the storage controller that provides the cache memory subsystem management features hereof, etc.). Network adapter interfaces 410 may also be integrated with the system to enable processing system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable in a storage device having a cache memory subsystem, the memory subsystem comprising a DDR memory controller coupling a computational device of the storage device with one or more DDR memory devices, the method comprising:
   initializing the storage device where the initialization comprises successfully training the DDR memory controller to interface with the DDR memory devices;
   detecting a failure of the memory subsystem;
   configuring the DDR memory devices to enable a self-refresh mode responsive to detecting the failure; and
   initiating a re-training process between the DDR memory controller and the DDR memory devices responsive to detecting the failure wherein the re-training process, without resetting the DDR memory devices, comprises the steps of:
      configuring the DDR memory devices to disable the self-refresh mode; and
      manually refreshing contents of the DDR memory devices by operation of the computational device.

2. The method of claim 1 further comprising:
   detecting success of the re-training process; and responsive to detecting success of the re-training process, restoring error free operation of the storage device.

3. The method of claim 1 further comprising:
detecting failure of the re-training process; and
responsive to detecting failure of the re-training process, performing the steps of:
   applying a reset signal to the DDR memory controller without resetting the DDR memory devices; and
   repeating the step of initiating the re-training process.

4. The method of claim 1
wherein the step of initiating further comprises applying a reset signal to the DDR memory controller without resetting the DDR memory devices.

5. A method operable in a storage device having a cache memory subsystem, the memory subsystem comprising a DDR memory controller coupling a computational device of the storage device with one or more DDR memory devices, the method operable in response to detecting a failure of the memory subsystem during operation of the storage device following a successful training of the DDR memory controller, the method comprising:
   configuring the DDR memory devices to enable a self-refresh mode;
   configuring the memory subsystem to de-couple a reset signal applied to the DDR memory controller from a reset signal applied to the DDR memory devices;
   applying a reset signal to the DDR memory controller without resetting the DDR memory devices;
   determining whether user data is presently stored in the DDR memory devices;
   responsive to a determination that no user data is presently stored in the DDR memory devices, performing the steps of:
      configuring the memory subsystem to couple the reset signal applied to the DDR memory controller with the reset signal applied to the DDR memory devices;
      applying a reset signal to the DDR memory controller and the DDR memory devices; and
      re-training the memory controller;
   responsive to a determination that user data is presently stored in the memory devices, performing the steps of:
      initiating a re-training process between the DDR memory controller and the DDR memory devices; and
      during at least a portion of the re-training process, performing the steps of:
         configuring the DDR memory devices to disable the self-refresh mode; and
         manually refreshing contents of the DDR memory devices by operation of the computational devices.

6. The method of claim 5 further comprising:
detecting success of the re-training;
responsive to detecting success of the re-training, performing the steps of:
   configuring the DDR memory devices to enable a self-refresh mode;
   configuring the memory subsystem to couple the reset signal applied to the DDR memory controller with the reset signal applied to the DDR memory devices; and
   restoring error free operation of the storage device.

7. The method of claim 5 further comprising:
detecting failure of the re-training;
responsive to detecting success of the re-training, performing the steps of:
   configuring the DDR memory devices to enable the self-refresh mode;
   applying a reset signal to the DDR memory controller without resetting the DDR memory devices; and
   repeating the steps of the method.

8. A non-transitory computer readable medium tangibly embodying programmed instructions which, when executed by a suitable processor perform a method in a storage device having a cache memory subsystem, the memory subsystem comprising a DDR memory controller coupling the processor with one or more DDR memory devices, the method comprising:
   initializing the storage device where the initialization comprises successfully training the DDR memory controller to interface with the DDR memory devices;
   detecting a failure of the memory subsystem;
   configuring the DDR memory devices to enable a self-refresh mode responsive to detecting the failure; and
   initiating a re-training process between the DDR memory controller and the DDR memory devices responsive to detecting the failure wherein the re-training process, without resetting the DDR memory devices, comprises the steps of:
      configuring the DDR memory devices to disable the self-refresh mode; and
      manually refreshing contents of the DDR memory devices by operation of the computational device.

9. The medium of claim 8 wherein the method further comprises:
detecting success of the re-training process; and
responsive to detecting success of the re-training process, restoring error free operation of the storage device.

10. The medium of claim 8 wherein the method further comprises:
detecting failure of the re-training process; and
responsive to detecting failure of the re-training process, performing the steps of:
   applying a reset signal to the DDR memory controller without resetting the DDR memory devices; and
   repeating the step of initiating the re-training process.

11. The medium of claim 8
wherein the method step of initiating further comprises applying a reset signal to the DDR memory controller without resetting the DDR memory devices.

* * * * *